United States Patent [19]

Gutris

[11] Patent Number: 4,594,009
[45] Date of Patent: Jun. 10, 1986

[54] CASING FOR POROUS SELF-ALIGNING BUSHINGS, AND A BEARING INCLUDING THE BUSHED CASING

[75] Inventor: Giorgio Gutris, Premia' De Mar, Spain

[73] Assignee: European Electric Motors Design and Engineering Anstalt, Vaduz, Liechtenstein

[21] Appl. No.: 513,274

[22] Filed: Jul. 13, 1983

[30] Foreign Application Priority Data

Nov. 17, 1982 [IT] Italy ................. 24280 A/82

[51] Int. Cl.[4] ............... F16C 23/04; F16C 27/06; F16C 33/10; F16C 35/00
[52] U.S. Cl. ................... 384/203; 384/214; 384/215; 384/279; 384/286
[58] Field of Search ............... 384/192–222, 384/279, 286, 289, 290, 415; 308/245, DIG. 5

[56] References Cited

U.S. PATENT DOCUMENTS

| 1,793,874 | 2/1931 | Skillman | 384/214 |
| 2,223,872 | 12/1940 | McWhorter et al. | 308/DIG. 5 |
| 2,717,792 | 9/1955 | Pelley | 384/215 X |
| 2,962,327 | 11/1960 | Benevall | 384/279 |
| 3,034,838 | 5/1962 | Abel | 384/214 |
| 3,215,477 | 11/1965 | Arthur | 384/322 X |
| 3,934,953 | 1/1976 | Tooley | 384/210 |

FOREIGN PATENT DOCUMENTS

| 135882 | 12/1945 | Sweden | 308/DIG. 5 |
| 591319 | 8/1947 | United Kingdom | 308/DIG. 5 |

Primary Examiner—John M. Jillions
Assistant Examiner—Thomas R. Hannon
Attorney, Agent, or Firm—Wenderoth, Lind & Ponack

[57] ABSTRACT

A casing for porous self-aligning bushings combines in a single assembly formed from an elastic material all of the members which contribute to hold a bushing in position while allowing it to self-align, fits hubs of any configuration, provides insulation from noise and vibration, recovers lubricant normally expelled during relative rotation between the bushing and shaft therein. The casing can store up an amount of lubricant and, in the instance of a bushing rotating around a stationary shaft, retains the lubricant which would otherwise be forced out by centrifugal force from the outer porous surface of the bushing. A bearing includes such casing and the bushing elastically fitted therein.

3 Claims, 4 Drawing Figures

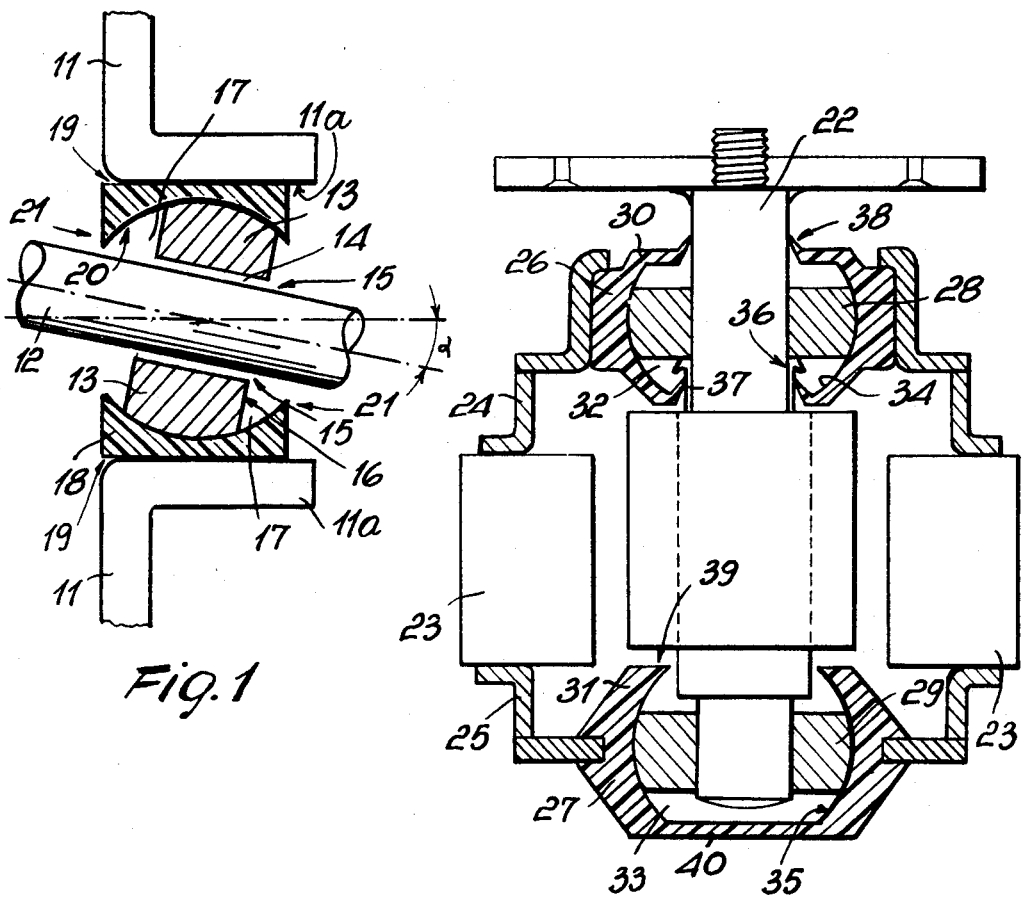
Fig. 1
Fig. 2
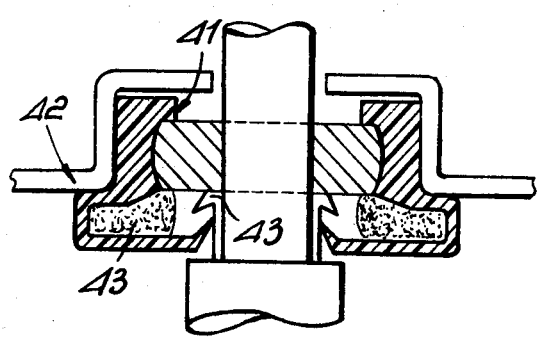
Fig. 3
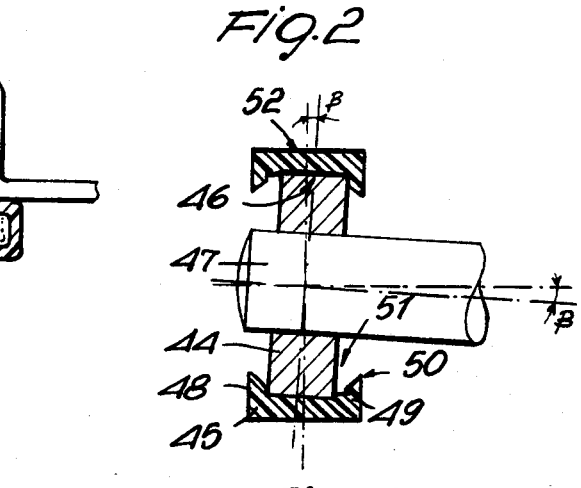
Fig. 4

CASING FOR POROUS SELF-ALIGNING BUSHINGS, AND A BEARING INCLUDING THE BUSHED CASING

BACKGROUND OF THE INVENTION

This invention relates to a shaft bearing system useful in any rotary machine, whether it is the shaft that is driven rotatively or the bearing system that is rotated while the shaft is held stationary. More specifically, the invention concerns a casing for porous self-aligning bushings intended for bearing applications.

A recognized requirement in the art is, with most applications, that each bushing should self-align with the rotation axis to compensate for imperfections of a larger or smaller extent in the angular relationship of the axis of the bore or hub seat, wherein the bushing is mounted, to the mating planes of the various parts of the machine incorporating such bushings.

It is known that such self-aligning feature mainly is achieved by holding the spherical bushing urged from one side against a corresponding conical surface formed in the hub, by means of springs, collars, washers, which are held in position by subsequent upsetting or other conventional fastening methods.

Rotation is known to create, in the very thin toroid resulting from the diameter differential—i.e. the clearance—between the shaft and bushing, a pressure which drives the lubricant out along the shaft at both ends of the bushing, to cause leakage and "drying" of the bushing.

It is known that in order to cause the bushing to recover and take in again by capillary action such lubricant, additional collars and washers have been used heretofore, but with unsatisfactory results where operation about a vertical axis is involved, which also brings into play the necessity of overcoming the force of gravity.

Small imbalances in the rotary portion, or minor distortions in the triangulation of the bushing bore or shaft surface, are known to reflect in the generation of vibrations and/or noise and/or beats in the machine operation, which disadvantages the rigid pressure mount described above and employed conventionally cannot help even to attenuate.

It is further known that those machines—indeed little accepted but having a promising future—which are designed to have their shaft stationary and the rotary portion born on self-aligning bushings rigidly attached thereto, i.e. arranged to rotate therewith, make use of lubricant-impregnated porous bushings problematic owing to the centrifugal action due to rotation acting on the lubricant mass to overcome the capillary action of the bushing, thereby the bushing loses the lubricant contained in it by centrifugation out of its porous outer peripheral surface.

SUMMARY OF THE INVENTION

All of the problems outlined above, as well as the need for the cited ancillary items and machining steps, are eliminated by the casing for rotary machine bearing bushings according to this invention, which is formed from an impervious heat- and lubricant-resisting elastomer and has an inner surface matching the outer surface of the bushing and adapted to retain any excess lubricant. The casing combines in a single assembly all of the members which cooperate to hold a bushing in position while allowing it to self-align, fits hubs of any configuration, whether cylindrical or otherwise, meets all of the cited requirements and avoids all of the above drawbacks. Moreover, the casing of the invention is very simple to use, and assembling the bushing therein and the casing within or over the hub is a quick and simple operation which requires no additional elements nor any special equipment.

BRIEF DESCRIPTION OF THE DRAWINGS

The invention will be more clearly understood, because of its simple construction, from the accompanying drawings which show preferred embodiments of the invention to make it suitable for a variety of applications, and wherein:

FIG. 1 is a sectional view of a casing for self-aligning spherical bushings according to this invention;

FIG. 2 is a sectional view of two improved modifications of this invention, which enable application on a vertical axis electric machine, of the inverted or "in-out" type, having a stationary shaft and rotating bushing;

FIG. 3 is a sectional view of another embodiment of the invention; and

FIG. 4 is a sectional view of another embodiment of the invention for use with cylindrical bushings, where the requirement for self-aligning features is least.

DETAILED DESCRIPTION OF THE PREFERRED EMBODIMENTS

The reference numeral 11 designates in FIG. 1 a hub of any selected configuration in any rotary type of machine. For illustration purposes, a cylindrical hub has been shown here to have a cylindrical surface 11a, since this is regarded by manufacturers to be the simplest shape to machine and preferable for assembling and securing the casing in the hub.

Indicated at 12 is the shaft of the machine, and the numeral 13 designates a bushing of any configuration having a spherical outer surface and a center bore wherein the shaft 12 is mounted for rotation.

As is known, during operation with a horizontal axis, in the toroid or clearance 14 there is created a pressure which forces the lubricant out of the toroid along the shaft to build up at the areas 15, where owing to the pressure being no longer felt, no forces will urge it any longer in an axial direction.

It is known that owing to the rotation of either element, the shaft or bushing, the lubricant is subjected, however, to a centrifugal force causing it to flow across the face 16 of the bushing, which will take it back in by capillary action, in part, while the rest is collected in an annular chamber 17.

The casing 18, according to this invention, comprises a heat- and lubricant-resistant elastomer such as a neoprene synthetic rubber. Its outer surface 19 preferably is at a slight interference fit with the hub inner surface, which is cylindrical in the example shown. Its inner surface 20 is spherical with substantially the same radius of curvature as the spherical exterior of the bushing 13.

The casing is preferably longer axially than the bushing, so as to form, at least on one side, an annular chamber 17 resulting from the excess of the spherical segment with respect to the width of the centrifuged lubricant collecting bushing, from which chamber the porous bushing again can take in the lubricant by capillary effect.

The casing is used as follows. The bushing 13 is first inserted into the casing 18 which, consistently with its main feature, will expand elastically to accommodate it, and then resume its original shape. The casing 18, complete with the bushing mounted therein, is placed in front of its seat provided in the hub 11, represented by the cylinder 11a in this example, and forced into it. The casing being formed from an elastomer, it will undergo a slight amount of deformation and fit into its seat by compression of its outer cylindrical surface, thus developing an adhesion force which prevents it from sliding out even without the aid of additional retaining means.

During the machine assembling stage, the shaft 12 is then inserted through the bore in the bushing 13.

FIG. 1 shows how the casing affords self-alignment capabilities for the bushing, by letting the spherical outer surface of the bushing rotate in contact with the inner surface 20 of the casing through an angle α as required to align the shaft axis to the axis of the hub bore. Where it is the bushing, along with its casing and hub, which revolves about a stationary shaft, the lubricant taken in by the porous bushing, and retained therein by capillary force, undergoes centrifugation and tends to flow out of the outer porous spherical surface and out of the system.

With the conventional rigid amount described hereinabove, there is nothing to stop the lubricant from leaking out, whereas in the mount of this invention the casing, by fitting close against the bushing outer surface, prevents the lubricant from flowing out of the spherical surface.

It is a feature of the invention, for the rotating bushing application, that at least one outer edge 21 of the casing has a smaller diameter than the diameter it has at the section corresponding to the face 16 of the bushing, so that between said face and said edge the annular chamber 17 is formed, wherein lubricant that flows by centrifugation out of the face 16—which will be rotating in this case—is also collected, and with the machine stationary, re-taken then in the bushing.

Shown diagramatically in FIG. 2, for the sole purpose of better illustrating the features of the casing according to this invention, is a rotary electric machine having a vertical axis and being of the inverted or in-out type, with the shaft 22 held stationary and the exterior 23 caused to rotate. The numerals 24 and 25 designate two shields or covers, which also are driven rotatively. Indicated at 26 and 27 are two casings, also arranged to rotate together with the bushings 28 and 29 which are mounted therein by temporarily deforming the walls 30 and 31 which are constructed from an elastic material.

With either casing, the excess lubricant, or lubricant coming out of the bushings, is collected downwardly in the chambers 32 and 33. As the element 23 begins to turn, and the elements 24,25,26, and 27 with it, the lubricant contained in the chambers 32 and 33 flow under centrifugal force up the conical walls 34 and 35, also rotating, and contacts the bushings 28 and 29, which can take it in if lacking lubricant.

In the casing 26 there is provided a small collar 36 rigid with the shaft 22. Collar 36 has a low friction coefficient at its surface contacting the bushing 28, and acts as a thrust bearing around which the vertical wall 37 of the chamber 32 rotates, such wall being terminated preferably in a thin lip wiping the collar 36. On the opposite end of casing 26, the wall 30 may also be provided with a thin lip 38 arranged to wipe the shaft to prevent dust, moisture, etc. from entering the bearing.

With the casing 27, the wall 31 would also be terminated preferably with a lip 39 arranged to wipe the shaft 22, while on the opposite end, the wall 40 closes the chamber 33 completely. In this example, the casing outer surface matches the very thin cover 25 to fully conform to its shape. The diameter of the access hole left in the walls 30 or 31, or their lips 38 or 39, will depend on the material used and individual requirements.

The exemplary casings 26 and 27 shown herein, while being designed specially for vertical in-out machines, are also useful with any horizontal machines, whether in-out or conventional, i.e. whether having a stationary shaft in a rotating bushing or a rotating shaft in a stationary bushing.

FIG. 3 illustrates another embodiment of the invention, wherein a large bore 41 facilitates the elastic insertion of the bushing through the casing whenever the latter, owing to the loads applied on the shaft, is to have a high Shore hardness to prevent it from yielding elastically and causing misalignment. An abutment 42 allows the casing to bear on it when the axial load being transmitted is significant. A ring 43 of an absorbing material holds an amount of lubricant stored therein. A larger chamber encloses the ring 43 to increase the amount of stored lubricant.

Shown in FIG. 4 is the casing of this invention in a simplified embodiment thereof which is suitable for more inexpensive and less sophisticated applications, useful where squareness and/or alignment imperfections are minimal. It will be possible to use in such cases a cylindrical bushing 44 instead of the spherical bushing shown in the previous figures, and consequently, a casing 45 having a cylindrical inside surface 46. All the other features of the invention described with reference to a casing having a spherical inner surface also apply, either singly or in combination, to the casing 45 having a cylindrical inner surface 46. In particular, the alignment of the bushing 44, for a small misalignment of the axis of the shaft 47 with respect to the casing axis may be accommodated by the elasticity of the elastomer which forms the casing 45.

In a preferred modified embodiment, one or more shoulders 48 and 49 hold the cylindrical bushing centered within the casing and/or bear any axial thrust forces. In another preferred embodiment, a lip 50 defines an annular chamber 51 for recovery of lubricant. The outer surface 52 will be matched to the hub which is to carry the casing.

Tanks, recovering devices, and walls, not shown specifically but similar to those described with reference to the spherical bushing casing and shown in FIGS. 2 and 3, may perfect the invention even in the instance of a casing with a cylindrical inner surface.

The invention is not restricted to its preferred embodiments, shown herein by way of example only. On the contrary, the scope of the invention includes any possible modifications thereof. As an example, the walls which complete the casing axially may have any shape, but preferably, at least one of them will be adapted to withhold excess lubricant.

Furthermore, the casing may be used with any hubs matching it, or may be secured with conventional fasteners. It is a peculiar feature of the invention that the particular accessory items described and illustrated may, in full or in part, be integrated to the casing, the latter being formed from an elastomer either by injection, molding, fusing, or otherwise, even to complex shapes, and deformable elastically to accept the bushing therein.

Another feature of the invention is that the casing, complete with its bushing, if constructed with its outer surface cylindrical, is configured and behaves as a ball bearing which it can replace in the same quill provided therefor, to bring about, however, the advantages which are inherent to quiet operation, durability, self-aligning capabilities, and low cost of self-aligning bushings.

I claim:

1. A rotary machine comprising:
   a shaft having a vertical axis;
   a porous bushing containing a lubricant and having an inner surface surrounding said shaft and an outer surface;
   a hub having an inner surface;
   a casing mounting said bushing within said hub, said casing consisting of a single integral annular solid body formed of an elastomeric material, said solid body having an annular outer surface interference fit with said inner surface of said hub and an annular inner surface mating with and complementary to said outer surface of said bushing;
   said solid body having at a lower axial end thereof an integral annular extension extending axially beyond said bushing and radially inwardly toward said shaft, said integral extension having an inner surface spaced axially from an adjacent axial end face of said bushing, said integral extension having therein a coaxially central opening receiving therethrough said shaft, said central opening being defined by a vertical wall extending upwardly and ending in a lip contacting said shaft; and
   said lip and said inner surface of said extension defining therein an annular chamber for retaining and/or collecting lubricant discharged downwardly from said bushing or flowing by gravity along said vertical shaft, and said lip preventing the entrance into said chamber of dust or moisture.

2. A bearing for supporting a vertical shaft in a hub of a vertical rotary bearing machine, said bearing comprising:
   a porous bushing containing a lubricant and having an inner surface to surround a vertical shaft and an outer surface;
   a casing for mounting said bushing within a hub, said casing consisting of a single integral annular solid body formed of an elastomeric material said solid body having an annular outer surface to be interference fit with an inner surface of the hub and an annular inner surface mating with and complementary to said outer surface of said bushing;
   said solid body having at a lower axial end thereof an integral annular extension extending axially beyond said bushing and radially inwardly toward the shaft, said integral extension having an inner surface spaced axially from an adjacent axial end face of said bushing, said integral extension having therein a coaxially central opening to receive therethrough the shaft, said central opening being defined by a vertical wall extending upwardly and ending in a lip adapted to contact the shaft; and
   said lip and said inner surface of said extension defining an annular chamber for retaining and/or collecting lubricant discharged downwardly from said bushing or flowing by gravity along the shaft, and said lip preventing the entrance into said chamber of dust and moisture.

3. A casing for a bushing for use in mounting a vertical shaft in a hub of a vertical rotary machine, said casing consisting of a single integral annular solid body formed of an elastomeric material, said solid body comprising:
   an annular outer surface to be interference fit with an inner surface of a hub;
   an annular inner surface to elastically contact an outer surface of a bushing;
   an integral extension extending from a lower axial end of said solid body axially beyond the bushing and radially inwardly of said inner surface of said solid body to contact the shaft, said integral extension having an inner surface to be spaced axially from an adjacent axial end face of the bushing, said integral extension having therein a coaxially central opening to receive therethrough the shaft, said central opening being defined by a vertical wall extending upwardly and ending in a lip adapted to contact the shaft; and
   said lip and said inner surface of said extension defining an annular chamber for retaining and/or collecting lubricant discharged downwardly from the bushing or flowing by gravity along the shaft, and said lip preventing the entrance into said chamber of dust and moisture.

* * * * *